(No Model.)

F. L. RICHTER.
COTTON CHOPPER.

No. 593,908. Patented Nov. 16, 1897.

WITNESSES:
John A. Bergstrom

INVENTOR
F. L. Richter
BY
Munn
ATTORNEYS.

UNITED STATES PATENT OFFICE.

FRANK L. RICHTER, OF MORAVIA, TEXAS.

COTTON-CHOPPER.

SPECIFICATION forming part of Letters Patent No. 593,908, dated November 16, 1897.

Application filed April 22, 1897. Serial No. 633,357. (No model.)

*To all whom it may concern:*

Be it known that I, FRANK L. RICHTER, of Moravia, in the county of Lavaca and State of Texas, have invented a new and useful Improvement in Cotton-Choppers, of which the following is a full, clear, and exact description.

The object of my invention is to provide a combined disk plow and a cotton-chopper capable of attachment to any form of cultivator, the cotton-chopping attachment being so arranged that all surplus plants will be cleanly and expeditiously cleared from the ground and the standing plants be left at predetermined intervals apart.

Another object of the invention is to provide a means whereby the disk plows as the machine is advanced will cultivate the ground between the rows of standing plants and to construct the machine in its entirety in a simple, durable, and economic manner.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
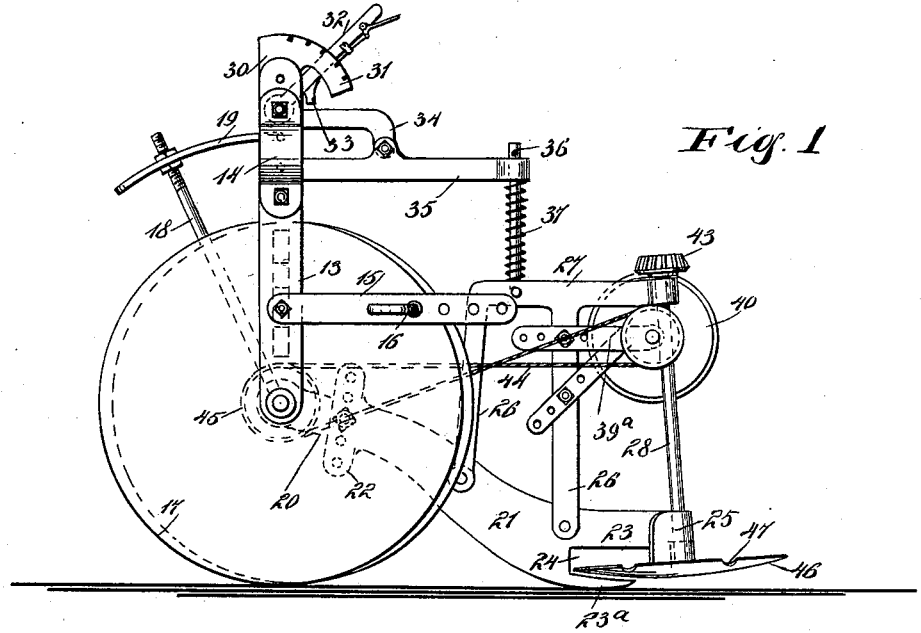
Figures 2, 4:
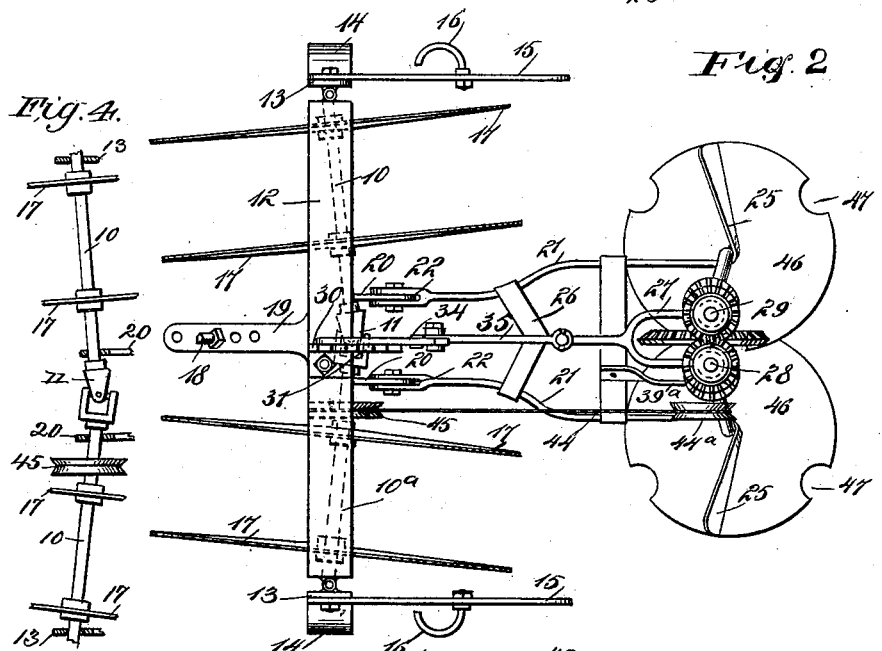
Figure 3:
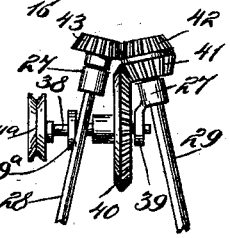

Figure 1 is a side elevation of the improved machine. Fig. 2 is a plan view, and Fig. 3 is a detail front elevation of the driving mechanism for the cotton-choppers. Fig. 4 is a detail view of the axle and a horizontal section through portions of the frame.

A frame 12, of substantially inverted-U shape, carries at the lower portions of its vertical members an axle which is made in two sections 10 and 10ª, and the sections are brought together at angles to one another, having a swivel or universal connection 11, as illustrated in Fig. 2.

At each side of the frame 12 an upright arm 13 is hinged to the said frame, which upright is provided with a series of apertures adapted to receive the bolts from a clip 14, the clips being used for the purpose of attaching the cotton-chopper to the iron beams of the cultivator. Each upright arm 13 is also provided near its lower end with a rearwardly-extending horizontal arm 15, and each horizontal arm 15 carries an adjustable clip 16, arranged for attaching the machine to the wooden beam of the cultivator. Disks 17, serving as plows or cultivators, are secured upon the sections of the axle, the disks at each side of the center of the axle having an opposite inclination, the inclination being such that the two sets of disks converge at their forward portions and diverge at their rear portions. The axle is sustained by means of a brace 18, loosely carried around one section of the axle and secured in any suitable or approved manner to a forwardly-extending bar 19, projected from the central portion of the frame 12.

An angular hanger 20 (shown in dotted lines in Fig. 1) has the upper end of its vertical member secured to the frame 12, the sections of the axle loosely passing through the said hangers where their two members connect. The lower or substantially horizontal member of each of the hangers is given a slight downward inclination and extends rearward, the hangers being one at each side of the coupling between the sections of the axle. A runner 21 is adjustably secured to each of the hangers. Each runner extends downwardly and rearwardly, being provided near its rear end with a curved shoe adapted for engagement with the ground, as shown in Fig. 1. The forward end of each runner is provided with a vertical head 22, having a series of apertures whereby, through the medium of suitable bolts, the runners may be adjustably connected to the said hangers.

A member 23 of each runner is carried over the shoe-section 23ª thereof, and a space 24 is provided between each shoe and each extension 23. Each extension 23 at its rear end is re-turned upon itself to provide an outwardly-extending yet forwardly-inclined scraper 25. A bifurcated brace 26 is attached to and connects the two runners, said brace at the top having a rearwardly-extending horizontal member 27, terminating at its rear extremity in a fork. At the rear extremity of each member of the fork a bearing is formed for the upper end of a shaft, the two shafts being designated, respectively, as 28 and 29.

A standard 30 is projected upward from the central portion of the frame 12, the standard being provided with a rearwardly-projecting riphery, and a driving connection, substantially as described, between the axle and the said disks, as and for the purpose set forth.

8. In a cotton-chopper or like machine, the combination, with an axle constructed in sections, the sections being at angles to one another, a swivel-coupling connecting the said sections, and disks secured on the sections of the axle, the disks of one section being at an angle to disks upon the opposite section, of runners supported from the axle, scrapers located at the rear ends of the runners, disks mounted to revolve beneath each scraper, the disks being in near relation and at angles one to the other, having recesses in their periphery, and a driving connection, substantially as described, between the axle and the said disks, a tension-controlled arm regulating the upward movement of the runners, a lever, and a rack for the same, the said lever being provided with an extension arranged to limit the upward movement of the tension-controlled arm, as and for the purpose set forth.

FRANK L. RICHTER.

Witnesses:
ERNEST LOMARK,
F. C. JACKSON.